T. W. VARLEY.
ELECTRICAL MEASURING INSTRUMENT.
APPLICATION FILED FEB. 3, 1906.
944,061.
Patented Dec. 21, 1909.
2 SHEETS—SHEET 1.
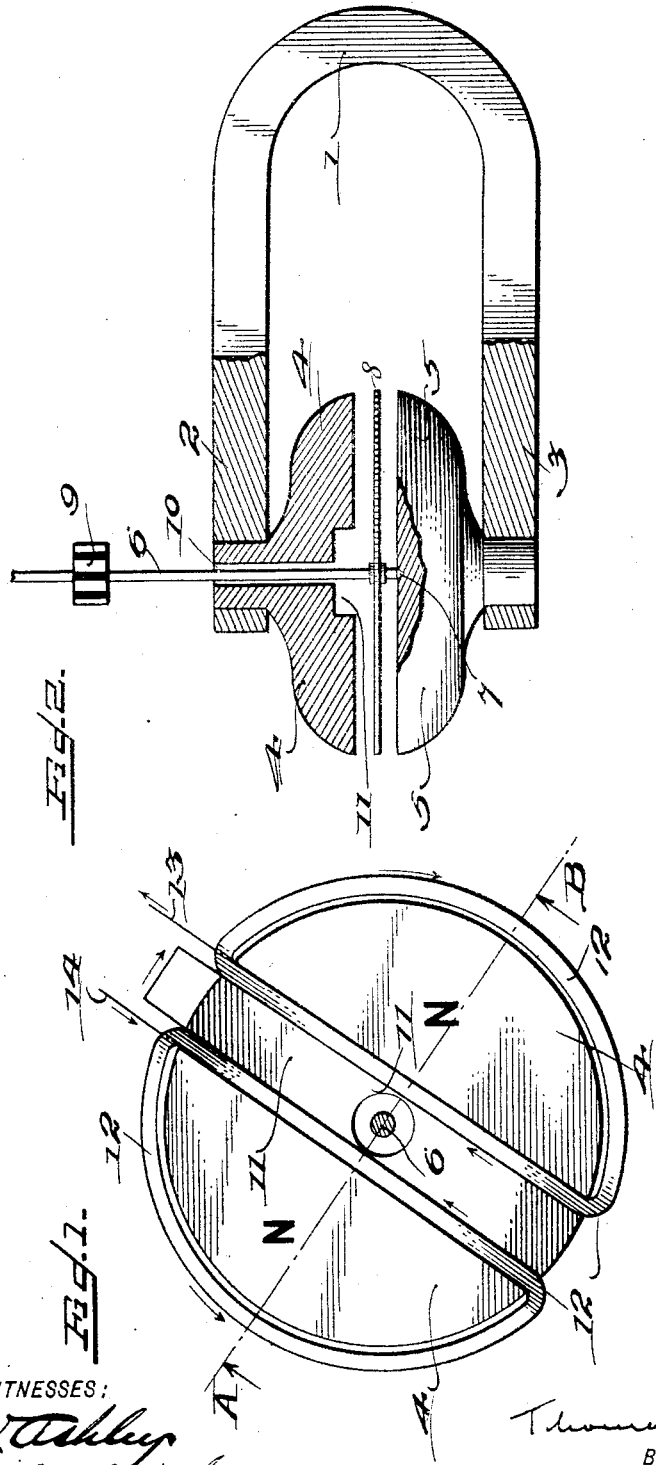
WITNESSES:
INVENTOR
ATTORNEY

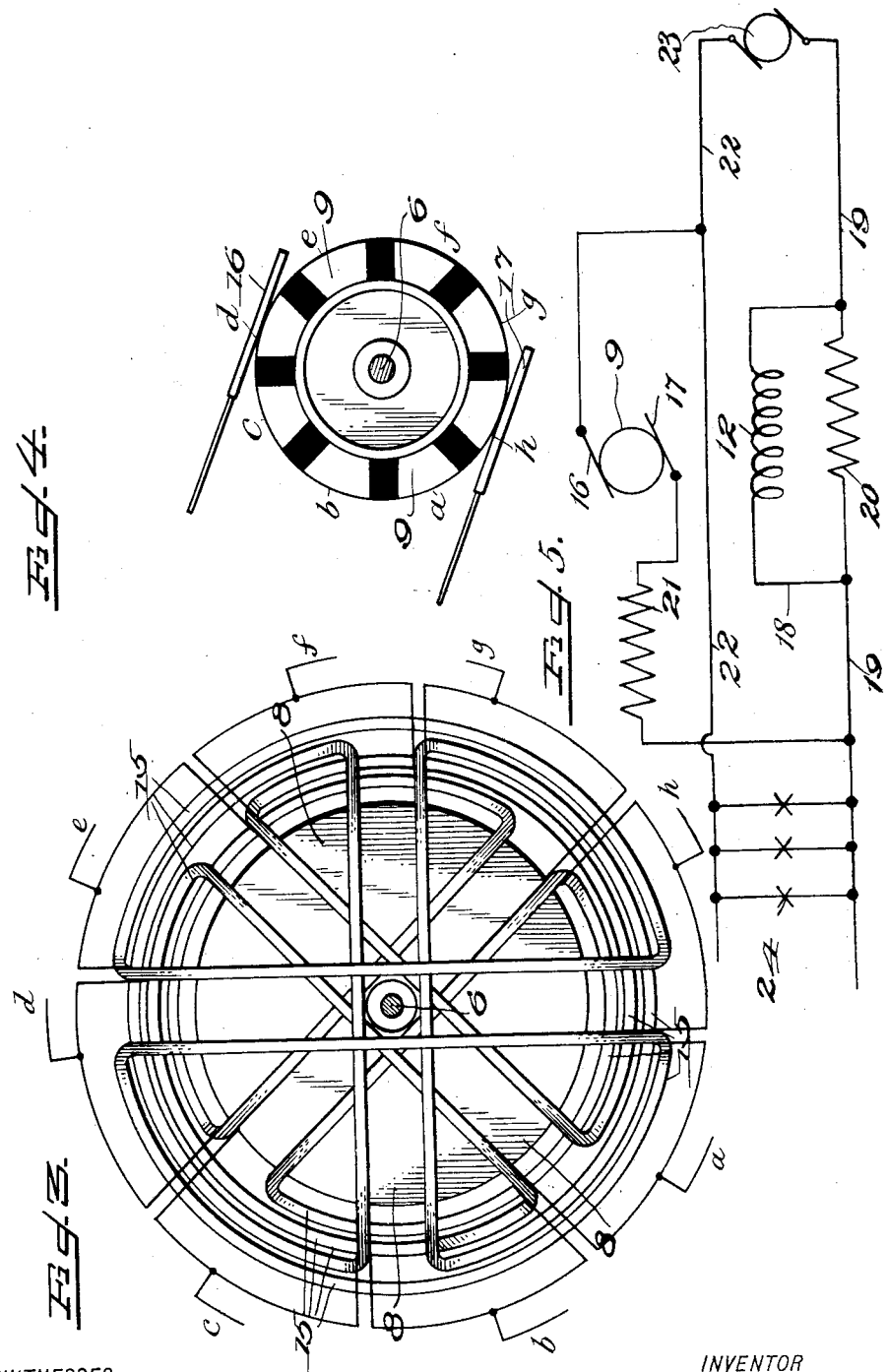

UNITED STATES PATENT OFFICE.

THOMAS W. VARLEY, OF NEW YORK, N. Y., ASSIGNOR OF ONE-HALF TO WALTER S. RUGG, OF NEW YORK, N. Y.

ELECTRICAL MEASURING INSTRUMENT.

944,061.

Specification of Letters Patent.   Patented Dec. 21, 1909.

Application filed February 3, 1906.   Serial No. 299,367.

*To all whom it may concern:*

Be it known that I, THOMAS W. VARLEY, a citizen of the United States, residing in the borough of Manhattan, city of New York, State of New York, have invented a new and useful Improvement in Electrical Measuring Instruments, of which the following is a specification.

My invention relates to improvements in electrical measuring instruments of that class wherein a movable element is employed in connection with a shifting or changing field adapted to impart movement to said movable element, and a substantially constant field adapted to retard the movement of said movable element by inductive action.

I have heretofore in United States Letters Patent Number 810,235, issued to me January 16, 1906, described and claimed certain features of such electrical instruments generically.

This invention has reference to improvements on the generic idea showing another specific form of movable element, together with certain methods of connecting and means for constructing such instruments. These and other features will be made apparent in the following description.

In the following I have described, with reference to the accompanying drawings, one type of electrical measuring instrument illustrating the application of the principles referred to, the features of the invention being more particularly pointed out hereinafter in the claims.

Figures 1, 2, 3 and 4 of the drawings illustrate said principles as applied to an integrating watt hour meter, Fig. 2 being a side elevation partly in section along the line A—B of Fig. 1 with the windings and certain parts removed. Fig. 1 is a plan view on an enlarged scale of the lower face of the upper pole piece illustrating the windings thereof diagrammatically. Fig. 3 is a plan view on an enlarged scale of the upper face of the movable element showing the windings thereon. Fig. 4 is an elevation of the commutator showing the brush connections and indicating the armature connections. Fig. 5 is a diagrammatic view of the connections as adapted for illustration with Figs. 1 to 4 inclusive.

In the several drawings similar parts are indicated by similar numerals of reference.

In Figs. 1, 2, 3 and 4—1 represents a substantially constant magnet, either electro or permanent, here illustrated as a permanent magnet for causing a substantially constant field and having poles 2 and 3. Pole pieces 4 and 5 are suitably supported in poles 2 and 3 respectively and as illustrated are preferably circular in shape.

6 is a shaft having one bearing at 7 on pole piece 5 and another bearing (not shown). Said shaft 6 carries a disk 8 preferably of aluminum and a commutator 9 and is adapted by means of suitable gearing (not shown) to be connected with any preferred type of recording means (not shown). Shaft 6 extends through a suitable opening 10 in pole piece 4.

11 indicates a diametrical channel countersunk in the lower face of pole piece 4 in which is placed a winding 12 in either the potential or load circuit, but here illustrated in the load circuit, 13 and 14 indicating the terminals of said coil which is illustrated as divided into two windings in series with each other, one winding being disposed around each half of the polar face, so that when current traverses said coil one of the polar faces will be strengthened and the other will be weakened.

The disk 8 supports a closed circuit winding 15 wound as indicated in Fig. 3 to form a two-pole armature each of the taps from the armature winding being connected to one of the commutator bars in the order in which they are shown.

16 and 17 indicate brushes making contact with the commutator 9 as shown.

In Fig. 3, $a, b, c, d, e, f, g$ and $h$ indicate the taps from the armature winding 15 as described, each tap being connected to the correspondingly lettered commutator bar as shown in Fig. 4.

In Fig. 5 a shunt circuit 18 from main 19 around resistance 20 passes through coil 12 in the load circuit. The winding on the disk 8 through commutator 9 is connected across the mains 19 and 22 through resistance 21.

23 indicates a source of direct current and 24 indicates the load.

Disk 8 when current is sent through the armature only is normally in a balanced condition with reference to the constant field because the torques are equal and balanced on all sides. When current is also sent through the fixed winding 12 as shown in Figs. 1 and 5 the field is thereby shifted or unbalanced thus unbalancing the torques on the disk and causing it to move. The disk which is in a field whose total strength is constant but not of equal strength at all points has currents induced in it by reason of its moving through these fields of variable strengths and hence acts to retard the movement of the disk and to make the rate of movement proportional to the torque.

The principles of the invention as shown and described are applicable to either alternating or direct currents and may be utilized in the construction of volt meter and ammeters as well as in either integrating or indicating wattmeters, as is clear to any one skilled in the art.

It is obvious that the details illustrated may be considerably varied and parts and functions transposed without departing from the spirit of my invention, as, for instance, using a greater or less number of windings than illustrated or transposing the functions of the field shifting and armature windings or utilizing other forms of armature or rotating or movable members than as described.

I do not restrict myself to any of the details as shown and described.

Having described my invention what I claim and desire to secure by Letters Patent is—

1. In an apparatus of the character described a substantially constant magnet, a coil adapted to weaken one part of the field caused by said magnet and strengthen another proportionally, the total magnetism of the changing field of the magnet remaining constant, and a winding forming a disk armature in the field caused by said magnet adapted to respond to the changing thereof.

2. In an apparatus of the character described a substantially constant magnet, a coil adapted to shift or distort the field caused by said magnet, and a winding forming a disk armature in said field adapted to respond to the shifting or distorting thereof.

3. In an apparatus of the character described a substantially constant magnet, a coil adapted to weaken one part of the field caused by said magnet and strengthen another, and a winding forming a disk armature in said field adapted to respond to the weakening and strengthening thereof.

In witness whereof I have hereunto signed my name in the presence of two subscribing witnesses.

THOMAS W. VARLEY.

Witnesses:
R. W. ASHLEY,
OLIN A. FOSTER.